United States Patent
Hayashi et al.

(10) Patent No.: US 6,841,769 B2
(45) Date of Patent: Jan. 11, 2005

(54) VIBRATION ATTENUATING MECHANISM AND METHOD FOR AN IMAGE PROCESSING DEVICE

(75) Inventors: Eiichi Hayashi, Saitama (JP); Yuichi Ishiyama, Kasukabe (JP); Osamu Shinohara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 203 days.

(21) Appl. No.: 10/232,414

(22) Filed: Sep. 3, 2002

(65) Prior Publication Data

US 2003/0062471 A1 Apr. 3, 2003

(30) Foreign Application Priority Data

Sep. 28, 2001 (JP) .......................... 2001-304468

(51) Int. Cl.[7] .............................. H01L 27/00; H04N 1/04
(52) U.S. Cl. ..................... 250/208.1; 250/234; 358/474
(58) Field of Search ............................ 250/234–236, 250/208.1; 358/474, 493, 494

(56) References Cited

U.S. PATENT DOCUMENTS

| | | | |
|---|---|---|---|
| 4,417,260 A | | 11/1983 | Kawai et al. |
| 5,469,205 A | | 11/1995 | Boeve et al. |
| 5,671,081 A | * | 9/1997 | Hisa .......................... 359/216 |
| 5,818,622 A | * | 10/1998 | Hisa .......................... 359/216 |
| 6,175,406 B1 | | 1/2001 | Iizuka et al. |
| 6,285,099 B1 | * | 9/2001 | Takami ........................ 310/51 |
| 6,407,380 B1 | | 6/2002 | Sung |
| 6,498,917 B2 | * | 12/2002 | Takami ........................ 399/227 |
| 2003/0063330 A1 | * | 4/2003 | Hayashi ......................... 358/474 |
| 2003/0063331 A1 | * | 4/2003 | Hayashi et al. ............. 358/474 |

FOREIGN PATENT DOCUMENTS

JP  10-257251  9/1998

* cited by examiner

*Primary Examiner*—Stephone B. Allen
(74) *Attorney, Agent, or Firm*—Arnold International; Bruce Y. Arnold

(57) ABSTRACT

A vibration attenuating mechanism and method is disclosed for the purpose of maintaining a high quality of image reading or writing while scanning a document with an image processing device which includes a carriage that supports an optical scanning element, a motor which drives the optical scanning element so as to scan a document for either reading or writing data, and a housing which supports the optical scanning element and the motor. At least one of a weight or a vibration absorbing material is provided nearby the motor so as to reduce vibrations which are transferred from the motor to the optical scanning element. In this way, the quality of image reading is maintained despite the recent trend toward increased scanning speeds.

8 Claims, 8 Drawing Sheets

VIBRATION ATTENUATING MECHANISM AND METHOD FOR AN IMAGE PROCESSING DEVICE

BACKGROUND OF THE INVENTION

Image processing devices that read images of a document operate by irradiating light from a light source such as a fluorescent lamp, etc., onto the document. The document may include, for example, text or image data that has been recorded on a paper surface, and the image processing device may perform different functions such as those of a copier or a scanner. In such devices, light that is reflected from the document is received by a light reception unit where it is imaged by an imaging lens onto a light receiver that is equipped with a photoelectric conversion device, such as a CCD. Generally, the imaging lens and photoelectric conversion device must be in predetermined positions for proper input of the data.

One or more mirrors are generally used to guide light that has been reflected from the document onto the light reception unit. In a still-document-type image reading device, because the light path length from the document to the light reception unit needs to be maintained constant when an illuminated portion of the document changes, a mirror is commonly arranged so that it can be moved along the document.

The structure of this type of image reading device 1 is shown in FIGS. 8 and 9. FIG. 8 is a schematic perspective view showing the structure of a still-document-type image reading device 1. Two guide plates 2b, 2e that resemble shelves are provided on the sidewall of a longitudinal wall 2a of a housing 2 of the image reading device 1. A full-traverse carriage 3 is then loaded onto the guide plates 2b and a half-traverse carriage 4 is then loaded onto the guide plates 2e. These carriages 3, 4 are guided by the guide plates 2b, 2e, respectively, and are moved in the longitudinal direction of the housing 2, which serves as a frame for supporting the components of the image reading device and also to block extraneous light from reaching the light reception unit. A non-illustrated platen, preferably made of glass, is mounted on the top surface of the housing 2, and a document is then loaded on the platen. A light source 5, such as a fluorescent lamp, is loaded on the full-traverse carriage 3, and the document is illuminated by the light source. Furthermore, a light receiver 20 that is equipped with an imaging lens 6 and a photoelectric conversion device 7, such as a CCD etc., is provided at a suitable position on the base plate 2c of the housing.

Then, a first reflecting mirror (not illustrated) is provided on the full-traverse carriage 3 and second and third reflecting mirrors (not illustrated) are provided on the half-traverse carriage 4. A light source 5 illuminates a portion of the document, and light that has been reflected from the document is incident onto the first mirror, the second mirror, and the third mirror, in that order, and is then imaged by the imaging lens 6 onto a surface of a photoelectric conversion device 7. Thus, an optical path is formed from the document to the photoelectric conversion device 7 by the first, second and third mirrors. Since nearly the entire area of the document must be illuminated in order to acquire all the information contained on the document, the full-traverse carriage 3 should be movable over nearly the entire area of the platen glass. However, the length of the optical path from the portion of the document being read at any particular instant to the photoelectric conversion device 7 must also be kept constant. Therefore, the half-traverse carriage 4 is driven to move in synchronism with the full-rate carriage 3, but at a rate of movement that is half that of the full-rate carriage.

FIG. 9 is a schematic diagram which illustrates in perspective view a driving mechanism for moving the full-rate carriage 3 and the half-rate carriage 4. A shaft 8 that is aligned normal to the scanning direction of the carriages is supported so as to rotate near one end of the housing 2, and a pulley 8a is fitted into the central part of the shaft 8. A motor 9 is fixed to the base plate 2c of the housing, and a pulley 9a is fitted onto an output shaft of the motor. A first belt 11a is driven by the motor via the pulley 9a so as to drive a first intermediate pulley 10a and a second intermediate pulley 10b. The pulley 10b is integrally attached to the pulley 10a but has a smaller diameter. A second belt 11b is driven by the second intermediate pulley 10b. In this fashion, the motor 9 causes the shaft 8 to rotate, but at a rate that is slower than the rotation rate of the motor. Due to the reduced rotation rate of the shaft 8 as compared to that of the motor, vibrations of the carriages as they are moved along beneath the platen are reduced. Reduction of vibrations becomes especially important as the size (and hence mass) of the image processing device is reduced.

A drive pulley 13 is fitted onto one end of the shaft 8, and a wire rope 14 is wound several times around the drive pulley 13. A pair of intermediate pulleys 15, 16 are provided which are independently rotatable about a common shaft that is attached to the half-rate carriage 4, with the axial direction of the shaft that supports these pulleys being aligned with the axial direction of the shaft 8. A pulley 17 is supported so as to be rotatable about a shaft near an opposite end of the housing 2 from the shaft 8, with the axial direction of the shaft which supports the pulley 17 being aligned with the axial direction of the shaft 8. Furthermore, a bracket 2d is provided at a position along wall 2a of the housing 2, with the drive pulley 13, wire rope 14, pulleys 15, 16, 17, and bracket 2d all being positioned inside the housing 2.

In order to drive the carriages 3 and 4, one end of the wire rope 14 is fixed to the bracket 2d. The wire rope 14 then passes half-way around the pulley 16, and is attached to the full-rate carriage 3 by a linking part 18. The wire rope 14 then passes several times around the drive pulley 13, passes half-way around the pulley 17 which is fixed in position relative to the housing 2, and then half-way around the pulley 15. The other end of the wire rope 14 then attaches to one end of a spring 19, which may be shaped as a coil. The other end of the spring 19 is attached to a sidewall of the housing 2. The linking part 18 includes a tongue 18a which projects from a base plate that forms the full-rate carriage 3, and a screw 18b which may be threaded into the linking part 18. The wire rope 14 is clamped by the screw 18b and the tongue 18a so as to attach the wire rope 14 to the full-rate carriage 3.

As taught in Japanese Laid Open Patent Publication H10-257251, the motor 9 may be attached to the bottom plate 2c of the housing 2 in order to achieve miniaturization of the image processing device. Therefore, vibrations of the motor 9 will inherently be transmitted via the housing 2 to the guide plates 2b and 2e, and this may cause the carriages 3 and 4, which are mounted on the guide plates 2b and 2e, to vibrate.

In recent years, an increase in the speed of image processing devices has come to be desired, and this has resulted in an increase in the moving speeds of the carriages. Even if the vibration of the motor 9 is made to be small, when the carriage speeds are further increased, there is a likelihood that vibrations which will result from the faster carriage movement will cause the obtained image data of the receiver unit to be degraded.

BRIEF SUMMARY OF THE INVENTION

The object of the present invention is to provide a vibration attenuating mechanism for an image processing device wherein vibrations of a motor are attenuated as much as possible so that carriages that are moved by the motor in order to perform image scanning of a document are not vibrated. In this way the quality of scanned image data is maintained, despite the recent trend toward higher image scanning speeds.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an image processing device such as an image reading device which irradiates light onto a document containing text or image data and acquires image information therefrom as it sequentially scans the document, or an image writing device which sequentially scans image data onto a photosensitive material such as printing paper in order to print an image of a document. More particularly, the present invention relates to an image processing device wherein vibrations which are generated by a motor, or other means that drive one or more carriages during a scanning process of a document, are attenuated.

Various embodiments of the present invention will now be discussed in detail.

Embodiment 1

Figure 1:
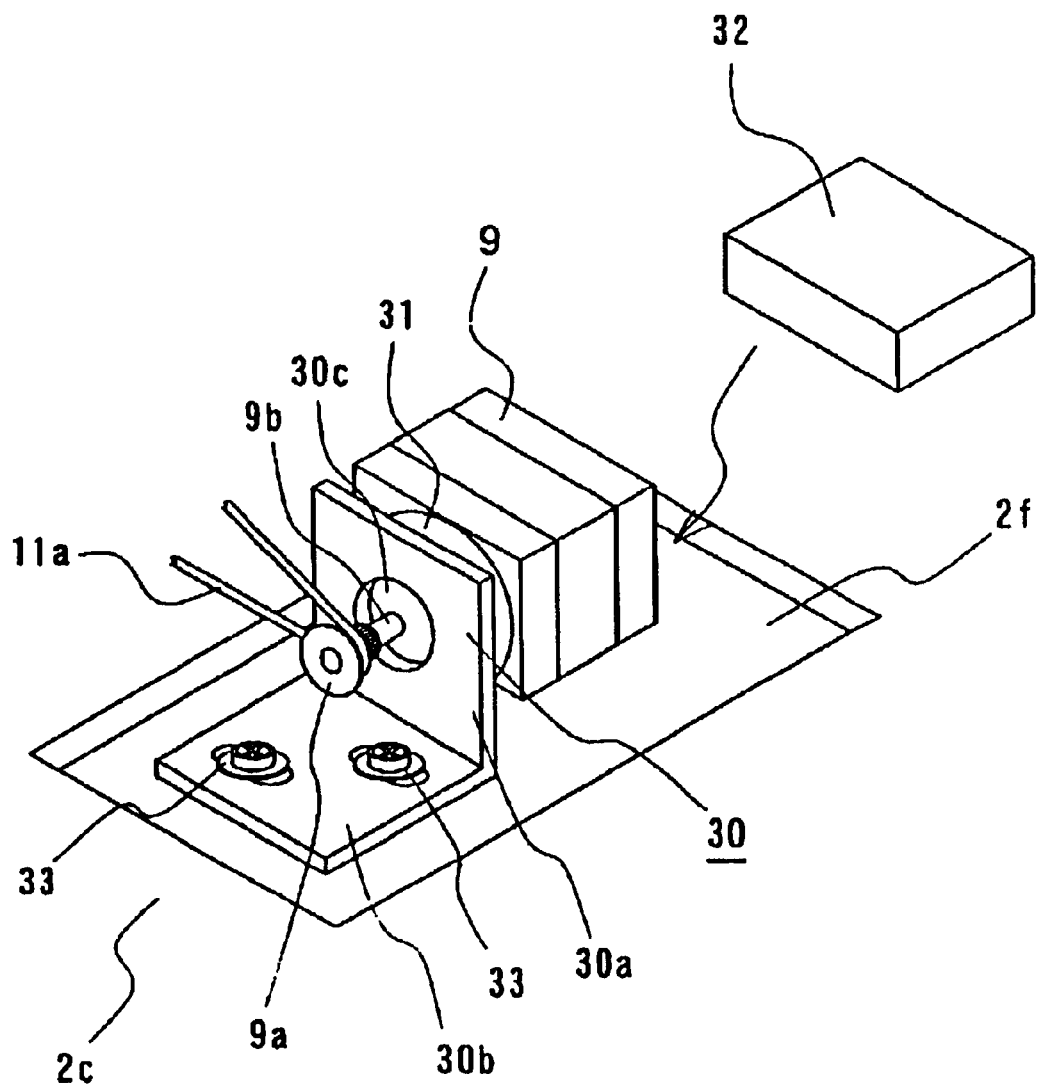
FIG. 1 shows, in perspective view, a partially-assembled vibration attenuating mechanism of an image processing device according to a first embodiment of the present invention.
Figure 2:
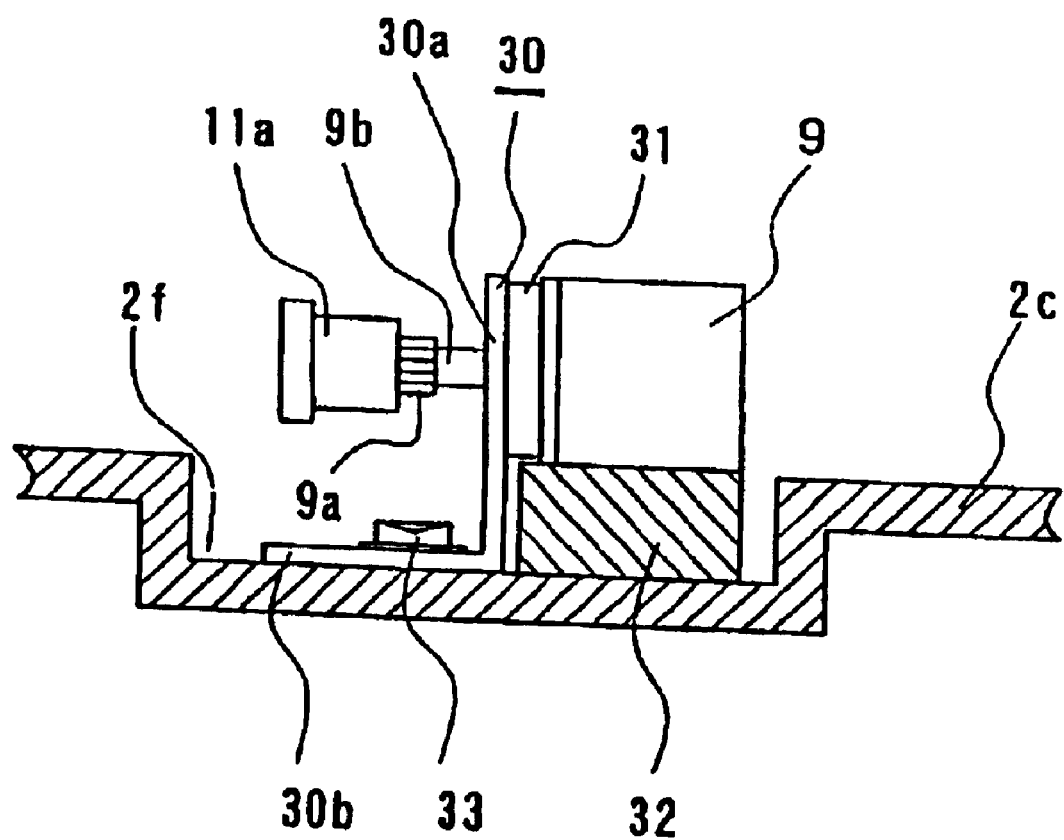
FIG. 2 is a side view of the vibration attenuating mechanism shown in FIG. 1, when fully assembled.

FIGS. 1 and 2 illustrate a first embodiment of the vibration attenuating mechanism for an image processing device of the present invention. As shown in FIG. 2, a motor 9 is fixed to one arm section 30a of a motor bracket 30 having a substantially L-shaped cross section, and the other arm section 30b is fixed within a depressed region 2f that is formed on a part of the bottom plate 2c of the housing 2. A motor bracket 30 is attached to the motor on the output axis 9b side of the motor, with the output axis projecting above the other arm section 30b of the motor bracket. The arm section 30b is attached to the depressed region 2f using screws 33. As shown in FIG. 1, a through hole 30c is formed on the arm section 30a. Also, a vibration absorbing material 31 is inserted between the arm section 30a and the motor 9. In addition, a driving pulley 9a is mounted onto the output axis 9b, and a first belt 11a is mounted around the driving pulley 9a.

A vibration absorbing liner 32 that is formed of a material such as a sponge or a vibration absorbing rubber is partially compressed and inserted between the motor 9 and the top surface of the depressed region 2f of the housing. In this way, vibrations which are generated by operation of the motor 9 are absorbed by the vibration absorbing liner 32. Thus, transmission of vibrations to the housing is suppressed.

Embodiment 2

Figure 3:
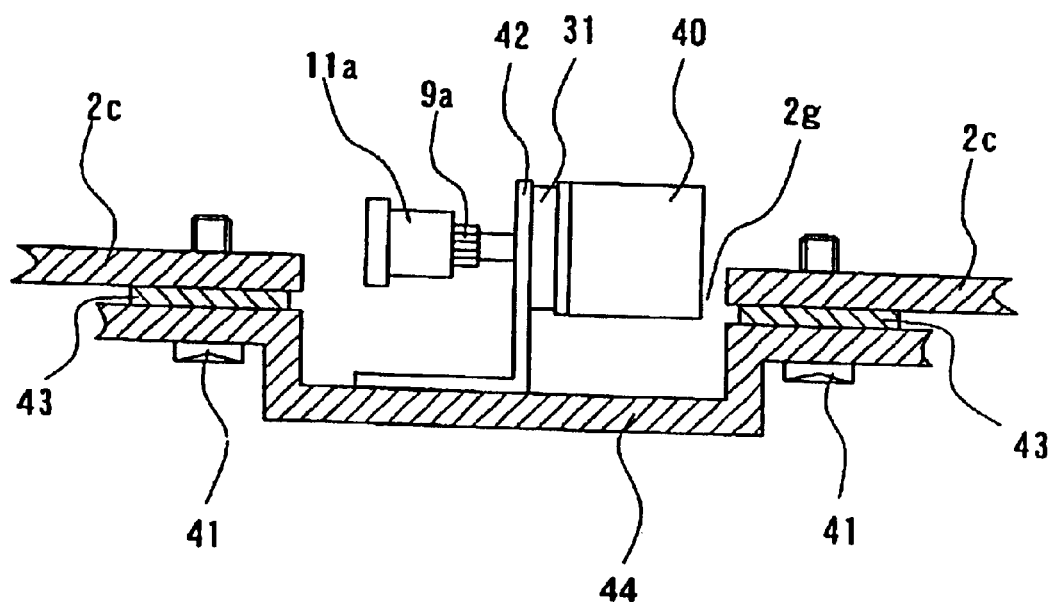
FIG. 3 is a side view of a vibration attenuating mechanism of an image processing device according to a second embodiment of the present invention, when fully assembled.

A second embodiment of the present invention is shown in FIG. 3. An open section 2g of a bottom plate 2c is formed at an appropriate position in the bottom plate, and a separate section 44 is detachably attached to the bottom plate 2c by screws 41. As in FIG. 1, motor bracket 42 may be used to support the motor. The separate section 44 is attached to the bottom plate 2c via a vibration absorbing washer 43, which is formed of material such as sponge or a vibration absorbing rubber. Although not illustrated, preferably, a vibration absorbing washer 43 is also attached between the head of the screws 41 and the separate section 44, so that both upward and downward accelerations are attenuated.

In this embodiment, even if vibrations generated by operation of the motor 40 are transmitted to the motor bracket 42, the vibrations will be at least partially absorbed by the vibration absorbing washer 43. Therefore, transmission of vibrations to the carriages 3 and 4 will be suppressed. Instead of this arrangement, even more effective attenuation can be provided by modifying the device of Embodiment 1 by additionally inserting the vibration absorbing washers 43 of FIG. 3 between the heads of the screws 33 (FIG. 1) and the arm section 30b, as well as between the arm section 30b and the depressed region 2f of the housing.

Embodiment 3

Figure 4:
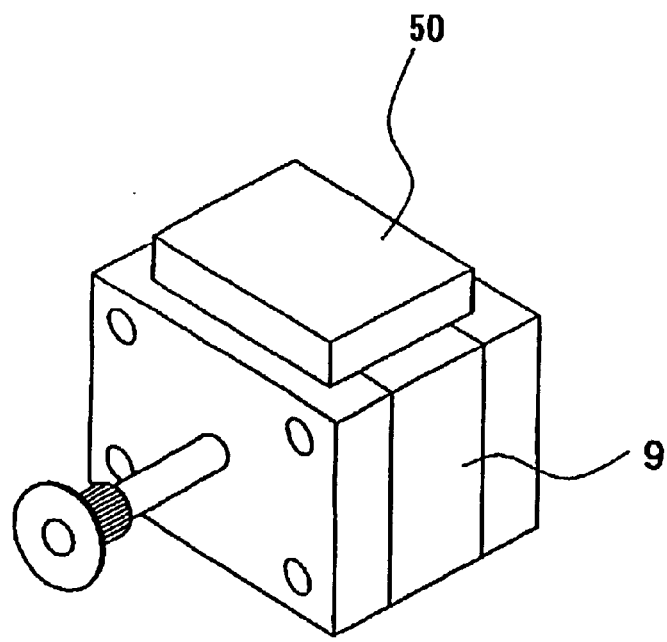
FIG. 4 is a perspective view of a vibration attenuating mechanism of an image processing device according to a third embodiment of the present invention.
Figure 5:
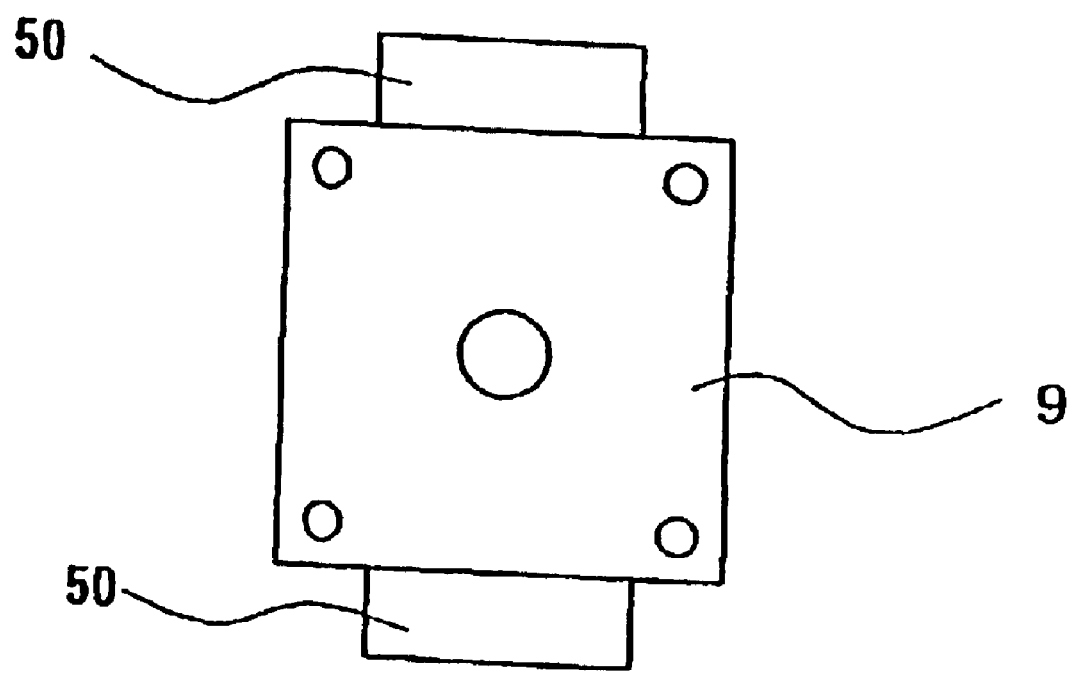
FIG. 5 is a front view of the vibration attenuating mechanism shown in FIG. 4.
Figure 6:
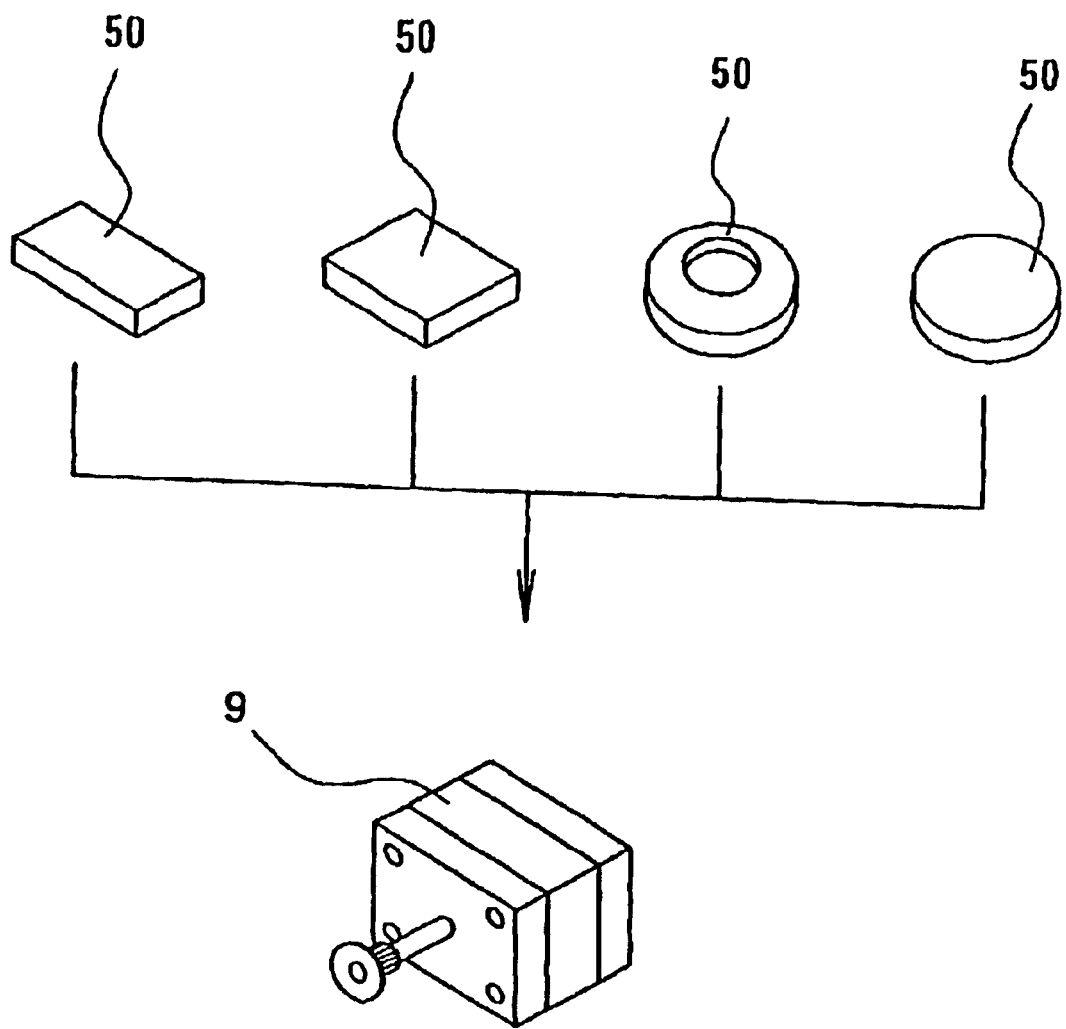
FIG. 6 is a perspective view illustrating differently shaped weights that may be used according to the third embodiment.
Figure 7:
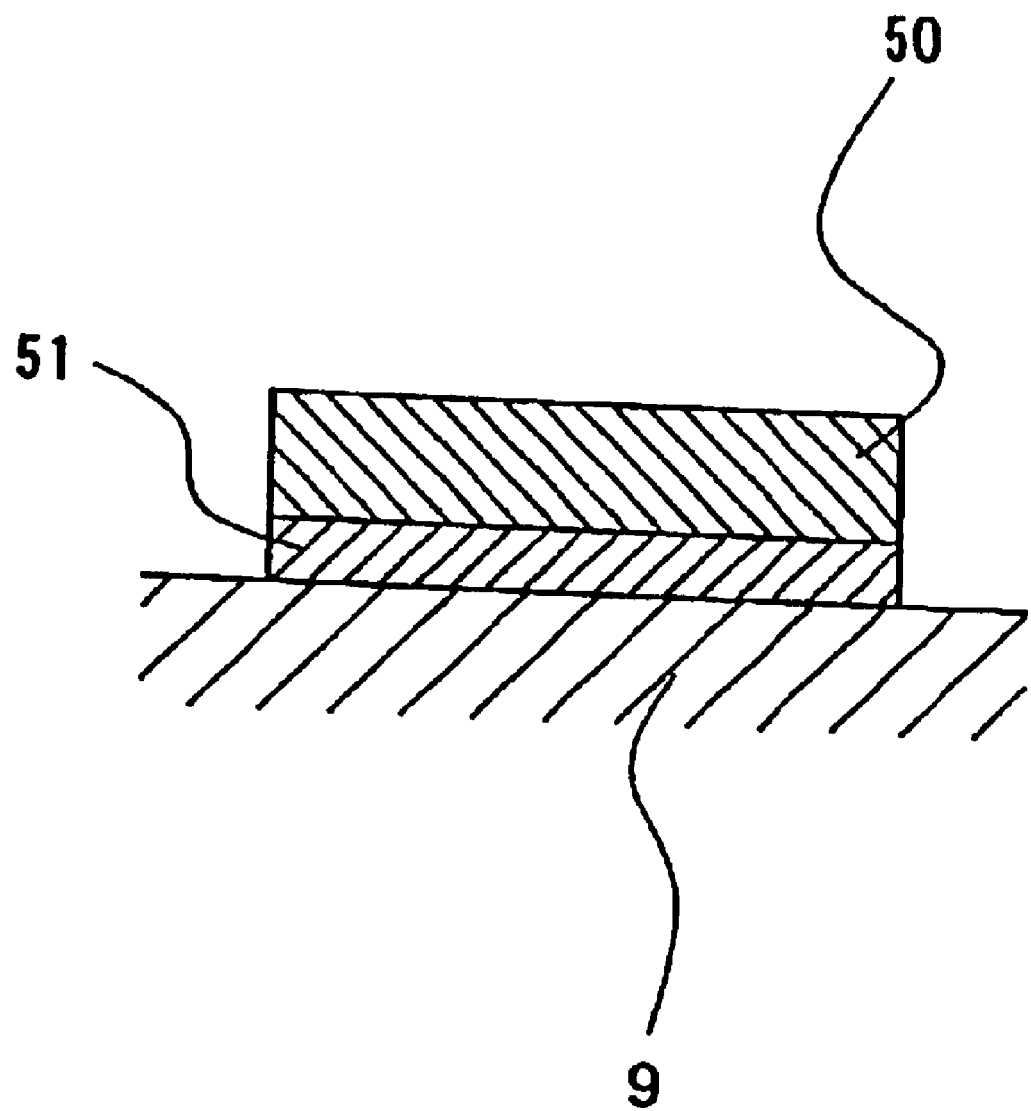
FIG. 7 is a side, cross-sectional view showing a weight attached to a top surface of a motor via a vibration absorbing liner.
Figure 8:
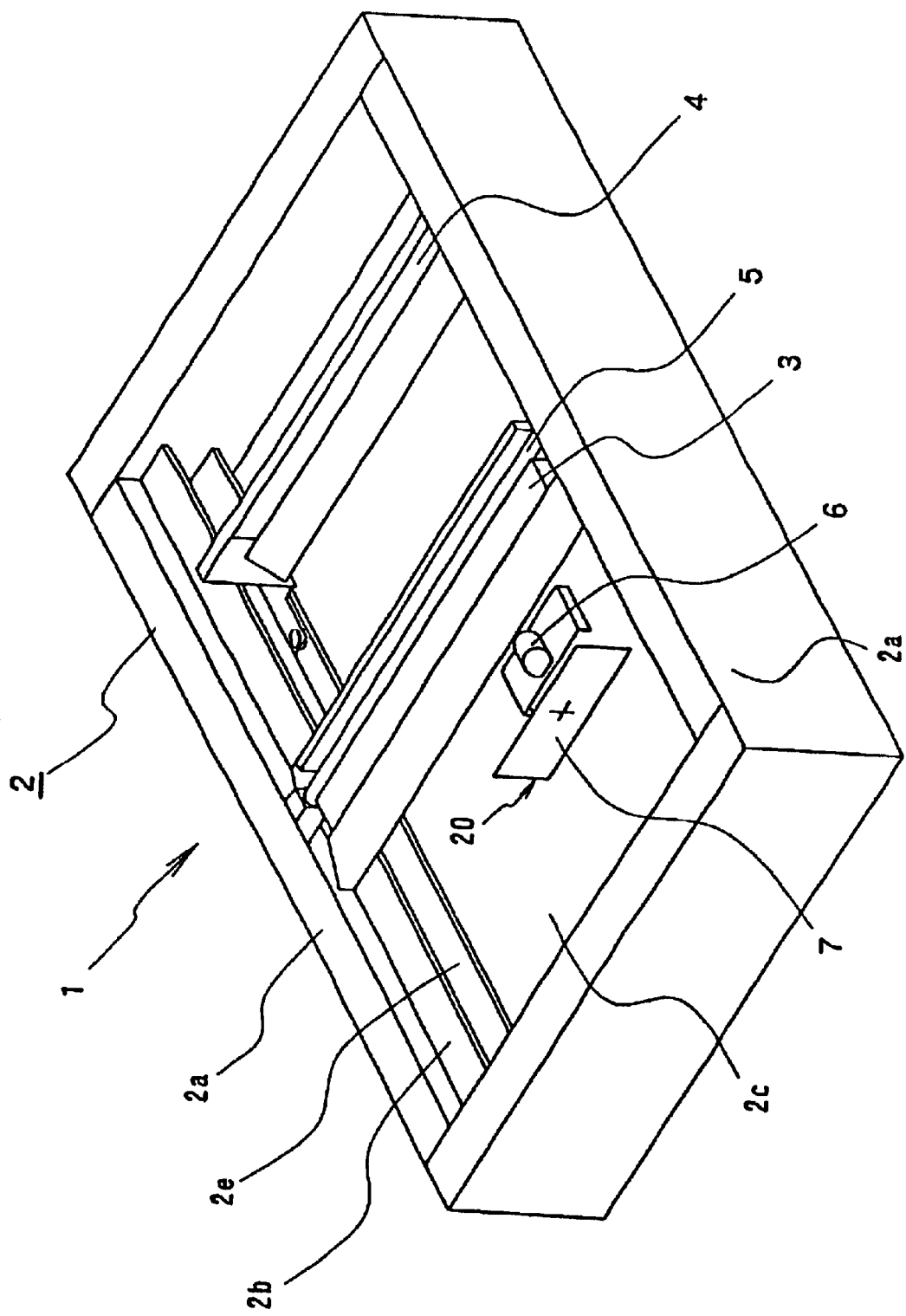
FIG. 8 is a schematic diagram which illustrates, in perspective view, some of the structure of a still-document-type image processing device according to a different invention, and it is this sort of structure that is suited to being equipped with the vibration attenuating mechanisms of the present invention.
Figure 9:
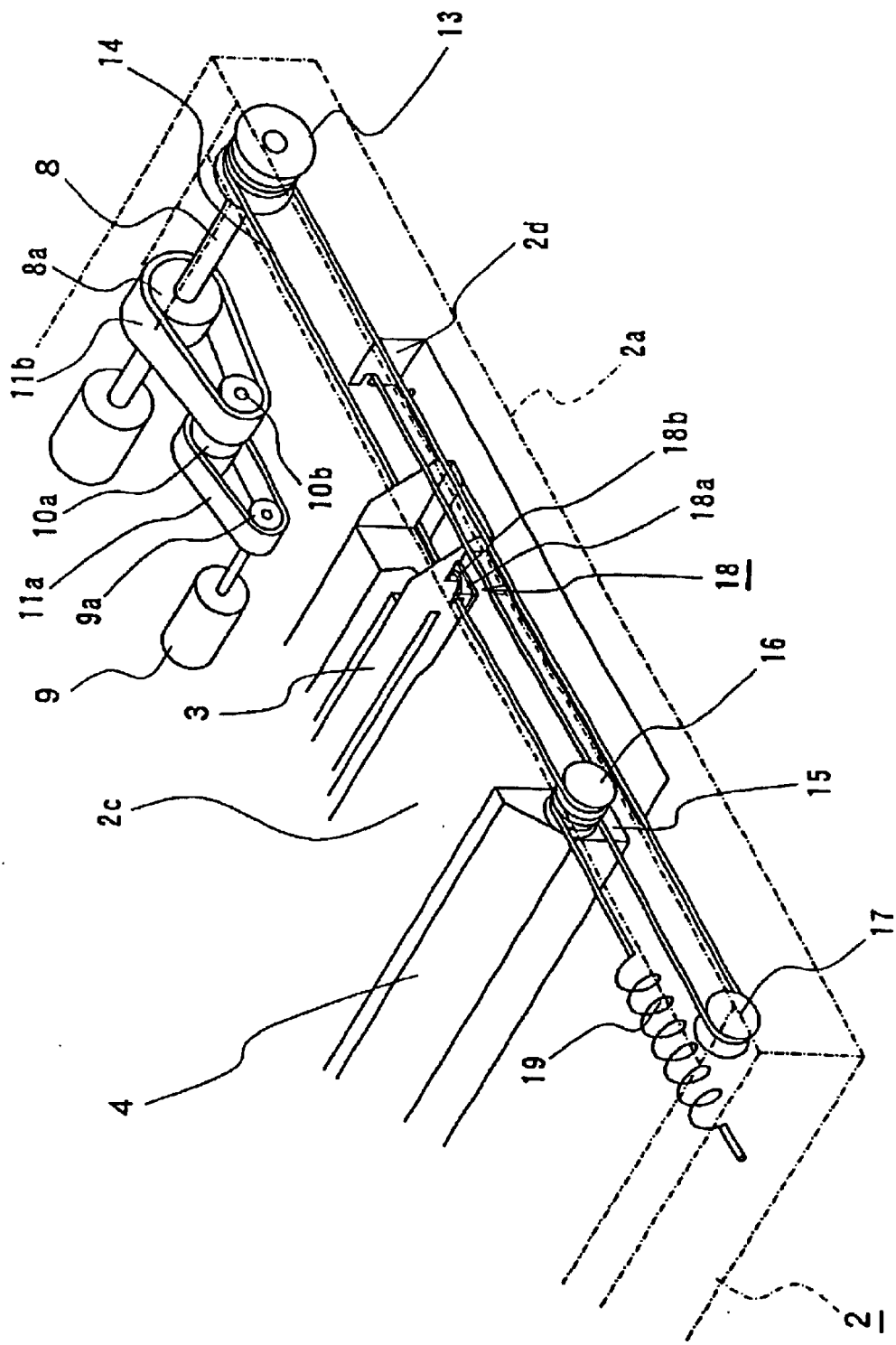
FIG. 9 is a schematic diagram which illustrates, in perspective view, driving mechanisms for carriages of the still-document-type image processing device illustrated in FIG. 8.

A third embodiment of the present invention is shown in FIGS. 4–6. In this embodiment, one or more weight(s) 50 can be attached to the motor 9 in order to suppress vibrations of the motor. The motor 9 may be attached to the housing in any of the ways previously discussed. Also, the weight(s) 50 can be any of a variety of shapes, such as rectangular, square, annular or circular, as illustrated in FIG. 6. Furthermore, the weights can be made of metal covered with a vibration absorbing material, such as rubber. As shown in FIG. 7, a vibration absorbing liner 51 formed of a material such as a sponge or a vibration absorbing rubber may be inserted between the weight 50 and the motor 9. The vibration absorbing liner 51 may be adhered to the weight 50 and to the motor 9 using an adhesive. Once again, in this way, the transmission of vibrations to the carriages 3 and 4 can be suppressed. The number of weights used as well as the mass of the weight(s) 50 may be appropriately adjusted for the rotation speed of the motor 9.

Although the above embodiments apply particular vibration attenuating mechanisms to an image reading device, the present invention is not limited to image reading devices, and can instead be applied to image writing devices such as used in photo printing. Thus, the present invention will find applications wherever a carriage mechanism is used to scan a document in order to read data from the document The invention being thus described, it will be obvious that the same may be varied in many ways. For example, in the third embodiment, instead of the weight(s) being attached to a top or bottom surface of the motor, they may be attached elsewhere nearby, either to other surfaces of the motor, to the motor bracket 42, or between the motor bracket 42 and the housing. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In an image processing device which includes a carriage that supports an optical scanning element, a motor which drives the optical scanning element so as to scan a document for either reading or writing data, and a housing which supports the optical scanning element and the motor, the improvement of: providing a vibration absorber between the motor and the housing, wherein:

a bottom section of the housing to which the motor is attached is detachably attachable to a main portion of the housing, and a vibration absorbing element is inserted between the bottom section of the housing and the main portion of the housing.

2. In an image processing device which includes a carriage the supports an optical scanning element, a motor which drives the optical scanning element so as to scan a document for either reading or writing data, and a housing which supports the optical scanning element and the motor, the improvement of: providing a vibration absorber between the motor and the housing, wherein:

a bottom section of the housing to which the motor is attached is detachably attachable to a main portion of the housing, and a vibration absorbing element is inserted between the bottom section of the housing and the main portion of the housing; and the vibration absorbing element is made of a sponge material.

3. In an image processing device which includes a carriage that supports an optical scanning element, a motor which drives the optical scanning element so as to scan a document for either reading or writing data, and a housing which supports the optical scanning element and the motor, the improvement of: providing a vibration absorber between the motor and the housing, wherein:

a bottom section of the housing to which the motor is attached is detachably attachable to a main portion of the housing; and a vibration absorbing element is inserted between the bottom section of the housing and the main portion of the housing; and the vibration absorbing element is made of rubber.

4. A method of attenuating vibrations in an image processing device which includes a carriage that supports an optical scanning element, a motor which drives the optical scanning element so as to scan a document for either reading or writing data, and a housing which supports the optical scanning element and the motor, said method comprising: providing at least one of a weight or vibration absorbing material which is attachable to the motor, a support for the motor, or between a support for the motor and the housing.

5. In an image processing device which includes carriage that supports an optical scanning element, a motor which drives the optical scanning element so as to scan a document for either reading or writing data, and a housing which supports the optical scanning element and the motor, the improvement of: providing a weight which is attachable to the motor, a support for the motor, or between a support for the motor and the housing, said weight serving to attenuate vibrations that are transmitted from the motor to the optical scanning element.

6. The improvement as set forth in claim 5, wherein a vibration absorbing element is inserted between the motor and the housing.

7. The improvement as set forth in claim 5, wherein a weight is attached to one or more of the following surfaces: a top surface of the motor, or a bottom surface of the motor.

8. The improvement as set forth in claim 7, wherein a vibration absorbing element is inserted between the motor and the housing.

* * * * *

UNITED STATES PATENT AND TRADEMARK OFFICE
CERTIFICATE OF CORRECTION

PATENT NO. : 6,841,769 B2
DATED : January 11, 2005
INVENTOR(S) : Hayashi et al.

It is certified that error appears in the above-identified patent and that said Letters Patent is hereby corrected as shown below:

Column 5,
Line 2, change "the supports" to -- that supports --.

Signed and Sealed this

Twenty-sixth Day of April, 2005

JON W. DUDAS
*Director of the United States Patent and Trademark Office*